United States Patent Office 3,376,605
Patented Apr. 9, 1968

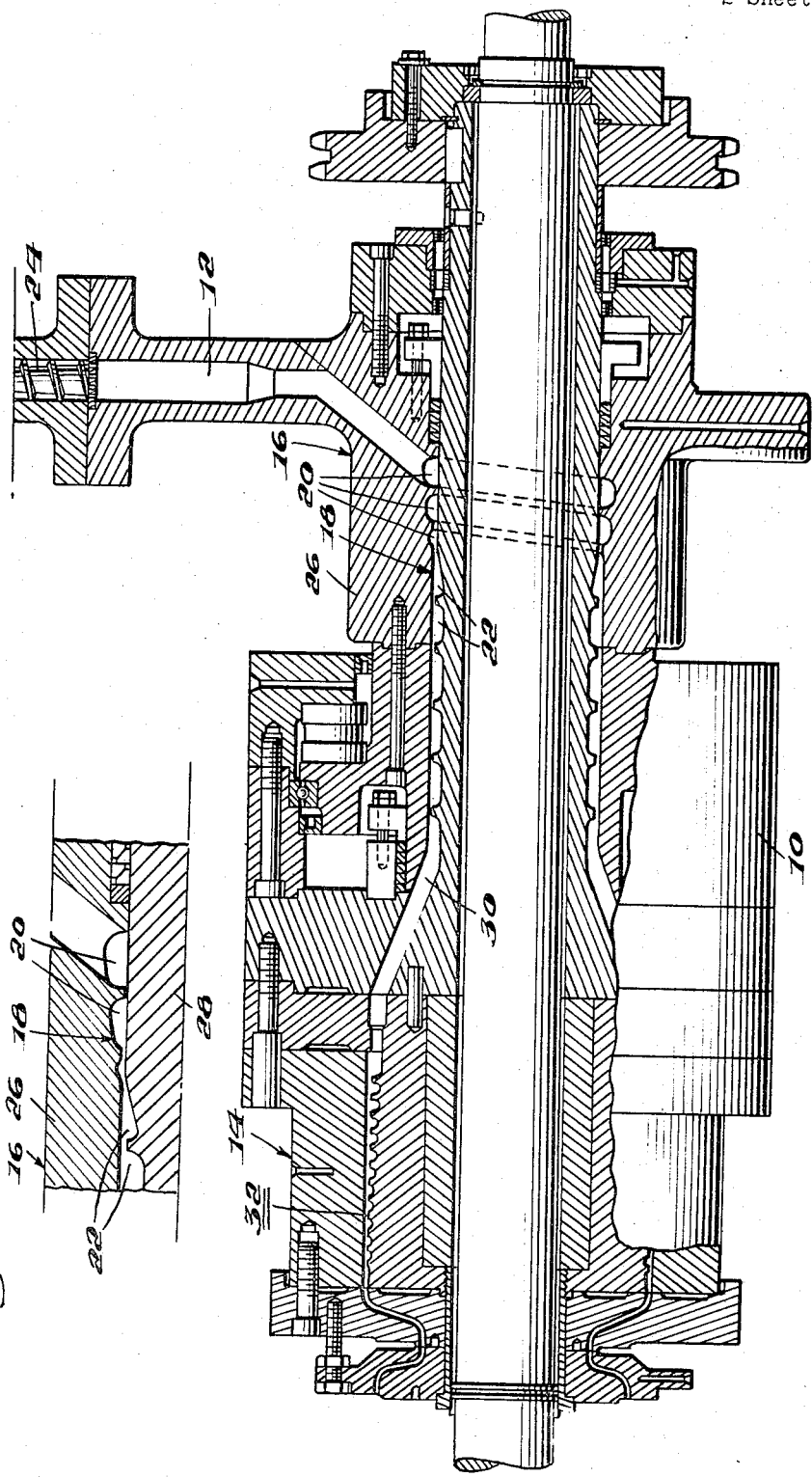

3,376,605
EXTRUSION APPARATUS
John H. Beattie, Florence, S.C., assignor to E. I. du Pont de Nemours and Company, Wilmington, Del., a corporation of Delaware
Filed Jan. 27, 1966, Ser. No. 523,378
4 Claims. (Cl. 18—14)

ABSTRACT OF THE DISCLOSURE

A die adapter for cross-head extrusion wherein uniform polymer flow is achieved by alternate helical and spiral paths advancing the melt first substantially helically and later with a progressively increasing axial flow toward the die.

---

Figure 3:
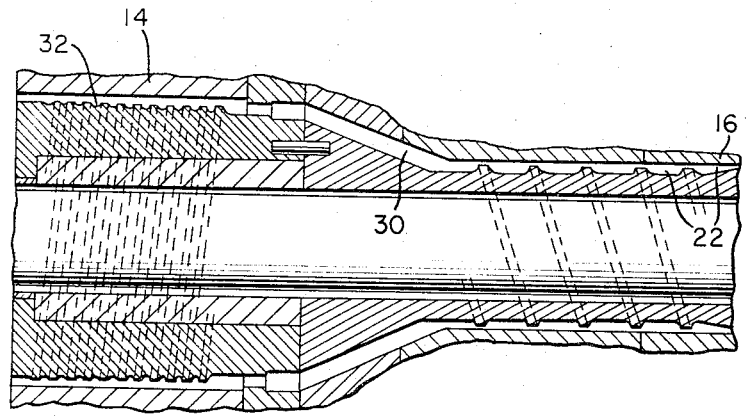

This invention relates to improved apparatus for extruding. More particularly, it relates to improvements in film extrusion from polymers such as polyolefins.

In tubular film extrusion apparatus, flow uniformity is critical. Flow uniformity affects film gauge, unit weight and roll formation. Non-uniform flow ahead of the die, such as in a die adapter, cannot be completely corrected by the die. The non-uniform flow creates non-random weight variation, thus causing slit-roll telescoping, stretched film and roll diameter variations. Stagnate areas existing in the die adapter and die, due to such non-uniform flow, cause polymer to be held and degraded. This leads to poor film quality and breakage of the film when particles of the degraded polymer are extruded.

There have been attempts, such as disclosed in U.S. Patent No. 2,260,750, to correct the difficulty experienced in forming tubes because of seams, vertical streaks, optical and other defects created when polymer was forced to flow around a mandrel or former and then reunited to form a tube when extruded. These difficulties were partly overcome by the use of a helical path, but still left a need for considerable improvement.

An object of this invention is therefore to produce film of improved quality.

A second objective is to provide apparatus for reducing weight variation and gel formation in extruding.

Another important objective is the provision of improved extrusion apparatus using alternating helixes and spirals to improve polymer distribution in the die adapter and die.

With these and other objects in view, the apparatus as provided herein includes a housing, side inlet means located near the back end of the housing for supplying polymer melt, a rotatable annular die located in the front end of the housing, and rotatable die adapter means within the housing intermediate the die and inlet. The die adapter means includes: a tubular passage in communicating relationship with the die and the inlet, at least one helical path within the tubular passage substantially adjacent the inlet which is adapted to progressively permit an increasing amount of melt to flow axially along the passage, and at least one spiral path within the tubular passage rearward of the helical path(s) to advance the melt axially and spirally from the helical path(s) to the die.

It is preferred that the helical path(s) of the die adapter be stationary while the spiral path(s) be adapted to be rotatable with the die adapter.

Details of a preferred embodiment for carrying out these and other objectives are shown by way of example in the accompanying drawings in which FIGURE 1 is a sectional elevation of a preferred embodiment of the apparatus of this invention and FIGURE 2 is an enlargement of the tubular passage 18 of die adapter 16 in FIGURE 1. FIGURE 3 is a fragmentray view of the extrusion apparatus wherein the helical path of the die and the spiral path of the die adapter are rotatable in different axial directions relative to each other.

Referring in more detail to the drawings, the apparatus generally includes a main housing 10, a side delivery inlet 12, a rotatable annular die 14, and a die adapter 16 having a tubular passage 18 therein. Within passage 18 are helical path 20 and spiral path 22. The crux of the present invention lies in die adapter 16 to be described in detail below and shown in FIGURE 2.

Referring in more detail to the accompanying drawings, polymer melt from a suitable source enters side delivery inlet 12 of main housing 10 via a pressure worm 24 or other conventional means. As the polymer melt progresses down the side inlet 12 it encounters the helical path 20 of the die adapter 16. As seen in FIGURE 2, the helix 20 in the outer cylindrical member 26 of the die adapter 16 forces the polymer to flow in a path favorable to the shear rheology. The helix 20 at first forces all the polymer in an essentially helical path, as the right end of helix 20 has essentially no land clearance between the helix land and the inner tubular core 28 of the die adapter 16. At each succeeding turn of the helix 20, there is an increased clearance between the helix land and the tubular core 28, with an accompanying increased polymer flow in the axial direction. The depth of the groove of the helix 20 correspondingly decreases as the polymer moves axially from right to left in the drawing. As the advancing polymer leaves the helical path 20, it enters spiral path 22 on the inner tubular core 28. The spiral 22 on the inner tubular core 28 of die adapter 16 is of substantially uniform depth, land crest and land clearance, and extends along the longitudinal section of the rotatable die adapter 16 toward the discharge end 30. The melt polymer flow thus is part spiral and part axial.

Attached to the discharge end 30 of the die adapter 16 is the rotatable annular die 14. Within the die 14 there is also a helical flow distributor 32. The helical distributor 32 provides a flow path which directs and distributes the flow similarly to the previous helical path 20. This distribution occurs along the length of the helix which is tapered to allow increasing amounts of axial flow of the polymer melt as the flow progresses toward the discharge end of the die 14 down its helical path.

The following example shows that the use of the apparatus of this invention decreases harmful weight variation:

Example

In a conventional tubular extrusion apparatus and process, such as described in Example 2 of Dyer and Heinstein U.S. Patent No. 2,966,700, polyethylene is extruded at 190° C. at a rate of 500 pounds/hour through a 24-inch annular die having a 20 mil annular lip opening. Layflat polyethylene film 62 inches wide and 1.5 mils (±0.22 mil) thick is obtained at a windup speed of 120 ft./min. The resulting roll is slit into 6 equal width rolls, which are weighed to determine the weight variation across the original roll. The weight variation is 3%.

With the same process, but using the die adapter of the present invention as illustrated in the drawing, and the die containing a helix, a roll is obtained which when slit into six equal width rolls shows a weight variation of only 0.6%.

The accompanying drawings of course are only by way of example, and various modifications are possible. The spiral in the tubular communication passage of the die adapter may be provided by either internal or external threads. The inner and outer members of the die adapter and die may be rotated in any number of various combinations, such as: the outer member rotated and the inner member stationary, and vice versa; they may be independently rotated in the same direction at the same or varying speeds; they may be rotated in opposite directions at the same speed or varying speeds; and so on. Rotation is preferable because it tends to produce a smearing or homogenizing action reducing weld lines and seams, and improving uniformity of the melt.

The use of alternating helixes and spirals in series in the die adapter is effective in reducing weight variation across rolls of film as seen above, in reducing gel formation, in improving polymer distribution, and in decreasing volumetric flow irregularities. Breaks due to degraded polymer have been minimized and essentially eliminated.

Weight variations of resulting rolls of film produced according to the process and apparatus of this invention are found to be less than one percent as compared with previous values of three to five percent or more with conventional extruding apparatus.

Various other modifications and changes in details may be made by those skilled in the art without departing from the spirit of the invention and the scope of the following claims.

What is claimed is:

1. An extrusion apparatus comprising in combination: a housing having a front end and a back end; side inlet means mounted near the back end of said housing for supplying polymer melt; a rotatable annular die having a tubular passage therein mounted in the front end of said housing; and rotatable die adapter means mounted within said housing between said annular die and side inlet means for advancing said melt from said inlet means to said annular die, said die adapter means having a tubular passage in communicating relationship with the tubular passage of said annular die and with said inlet means, at least one stationary helical path located in the tubular passage of said die adapter means substantially adjacent said inlet means which constrains a major portion of said melt to be advanced, said helical path adapted to progressively permit an increasing amount of melt to advance axially toward said die, and at least one spiral path located in the tubular passage of said die adapter means between said helical path and the tubular passage of said annular die, said spiral path adapted to advance said melt spirally and axially from said helical path to the tubular passage of said annular die and adapted to be rotatable with said die adapter means.

2. Claim 1, said annular die also having at least one helical path rotatable therewith within its tubular passage adapted to constrain a major portion of the melt advanced by said spiral path and to progressively permit an increasing amount of feed material to axially advance therethrough.

3. Claim 2 wherein the helical path of said annular die and the spiral path of said die adapter means are rotatable in the same axial direction.

4. Claim 2 wherein the helical path of said annular die and the spiral path of said die adapter are rotatable in different axial directions relative to each other.

References Cited

UNITED STATES PATENTS

| | | | |
|---|---|---|---|
| 1,904,884 | 4/1933 | Royle | 18—12 |
| 2,676,356 | 4/1954 | Becker | 18—14 |
| 2,765,491 | 10/1956 | Magerkuth | 18—12 |
| 2,787,022 | 4/1957 | Chrisholm | 18—12 |
| 3,203,048 | 8/1965 | Daubenfeld | 18—14 |
| 3,270,371 | 9/1966 | Schiedrum et al. | 18—14 |

FOREIGN PATENTS 322,522  11/1934  Italy.

WILLIAM J. STEPHENSON, *Primary Examiner.*